United States Patent
Haley et al.

(10) Patent No.: US 10,094,669 B2
(45) Date of Patent: Oct. 9, 2018

(54) SYSTEMS AND METHODS FOR INERTIALLY-INSTITUTED BINDING OF A RC VEHICLE

(71) Applicant: HORIZON HOBBY, LLC, Champaign, IL (US)

(72) Inventors: James Haley, Champaign, IL (US); Damon Hoyda, Aurora, IL (US); Brian James, Champaign, IL (US)

(73) Assignee: Horizon Hobby, LLC, Champaign, IL (US)

( * ) Notice: Subject to any disclaimer, the term of this patent is extended or adjusted under 35 U.S.C. 154(b) by 0 days.

(21) Appl. No.: 14/927,005

(22) Filed: Oct. 29, 2015

(65) Prior Publication Data
US 2017/0123416 A1    May 4, 2017

(51) Int. Cl.
| | |
|---|---|
| *G06F 17/00* | (2006.01) |
| *G06F 7/00* | (2006.01) |
| *G05D 3/00* | (2006.01) |
| *G01C 21/18* | (2006.01) |
| *G08C 17/02* | (2006.01) |
| *A63H 30/04* | (2006.01) |
| *A63H 17/26* | (2006.01) |
| *A63H 18/00* | (2006.01) |

(52) U.S. Cl.
CPC ............ *G01C 21/18* (2013.01); *A63H 17/26* (2013.01); *A63H 18/00* (2013.01); *A63H 30/04* (2013.01); *G08C 17/02* (2013.01); *G08C 2201/20* (2013.01); *G08C 2201/32* (2013.01)

(58) Field of Classification Search
CPC ...... A63F 13/10; A63F 13/211; A63F 13/245; A63F 13/833; A63F 2300/1037; A63F 2300/105; A63F 2300/1062; A63F 2300/64; A63H 30/04; G08C 19/28
See application file for complete search history.

(56) References Cited

U.S. PATENT DOCUMENTS

| | | | | |
|---|---|---|---|---|
| 4,165,581 A | * | 8/1979 | Wolf ................. | A63H 30/04 446/175 |
| 4,207,502 A | * | 6/1980 | Omura ................ | A63H 30/04 318/16 |
| 4,208,834 A | * | 6/1980 | Lin .................... | A63H 3/06 446/226 |
| 4,213,270 A | * | 7/1980 | Oda .................... | A63H 17/36 446/456 |
| 4,938,483 A | * | 7/1990 | Yavetz ................ | A63H 30/04 273/454 |
| 4,964,837 A | * | 10/1990 | Collier ................ | A63H 17/34 369/30.02 |

(Continued)

*Primary Examiner* — Khoi H Tran
*Assistant Examiner* — Jorge O Peche
(74) *Attorney, Agent, or Firm* — Baker Botts L.L.P.

(57) ABSTRACT

Example implementations may relate to an RC vehicle with a receiver and an inertial measurement unit. In particular, the RC vehicle may include vehicle controller circuitry that works together with the inertial measurement unit to instruct the receiver to enter a bind mode when the RC vehicle is rotated, oriented, or positioned in a certain way. In an example embodiment, the RC vehicle may instruct the receiver to enter a bind mode when the RC vehicle is first powered on and is rotated 180 degrees in a certain direction, such as from upright to upside-down.

6 Claims, 7 Drawing Sheets

(56) References Cited

U.S. PATENT DOCUMENTS

| | | | | |
|---|---|---|---|---|
| 5,195,920 A * | 3/1993 | Collier | A63H 17/34 | 446/175 |
| 5,816,352 A * | 10/1998 | Hacker | A63G 25/00 | 180/167 |
| 5,878,356 A * | 3/1999 | Garrot, Jr. | G01C 11/02 | 348/144 |
| 6,368,177 B1 * | 4/2002 | Gabai | A63F 13/12 | 446/298 |
| 6,450,856 B1 * | 9/2002 | Aldred | A63H 17/00 | 446/454 |
| 6,679,752 B1 * | 1/2004 | Reed, Sr. | A63H 17/36 | 446/437 |
| 6,902,464 B1 * | 6/2005 | Lee | A63H 5/00 | 446/409 |
| 7,029,363 B2 * | 4/2006 | Ogihara | A63H 17/36 | 341/176 |
| 7,063,589 B2 * | 6/2006 | Matsukawa | A63H 1/04 | 446/256 |
| 8,302,728 B1 * | 11/2012 | Dotson | A63H 17/262 | 180/408 |
| 8,682,525 B1 * | 3/2014 | Kalinadhabhotla | G07C 5/008 | 340/442 |
| 8,818,571 B1 * | 8/2014 | Iida | A63H 30/04 | 446/456 |
| 9,352,242 B2 * | 5/2016 | Rehkemper | A63H 30/04 | |
| 9,931,580 B2 * | 4/2018 | Rehkemper | A63H 30/04 | |
| 2001/0021669 A1 * | 9/2001 | Gabai | A63H 3/28 | 463/39 |
| 2001/0029147 A1 * | 10/2001 | Hornsby | A63H 11/20 | 446/356 |
| 2001/0031603 A1 * | 10/2001 | Gabai | A63H 30/04 | 446/268 |
| 2002/0081941 A1 * | 6/2002 | Allmon | A63H 17/268 | 446/460 |
| 2003/0148703 A1 * | 8/2003 | Scott | A63H 30/04 | 446/456 |
| 2003/0220047 A1 * | 11/2003 | Aldred | A63H 30/04 | 446/454 |
| 2004/0035620 A1 * | 2/2004 | McKeefery | A63H 30/04 | 180/168 |
| 2004/0092208 A1 * | 5/2004 | Weiss | A63H 17/28 | 446/454 |
| 2006/0003666 A1 * | 1/2006 | Hardouin | A63H 17/045 | 446/454 |
| 2006/0083501 A1 * | 4/2006 | Segal | A63H 27/12 | 396/7 |
| 2006/0154563 A1 * | 7/2006 | Saeki | A63H 13/02 | 446/440 |
| 2006/0178085 A1 * | 8/2006 | Sotereanos | A63H 17/006 | 446/456 |
| 2006/0223637 A1 * | 10/2006 | Rosenberg | A63F 13/10 | 463/47 |
| 2007/0010159 A1 * | 1/2007 | Butler | A63H 17/02 | 446/36 |
| 2007/0072662 A1 * | 3/2007 | Templeman | A63F 13/00 | 463/6 |
| 2007/0097832 A1 * | 5/2007 | Koivisto | A63F 3/08 | 369/63 |
| 2007/0105474 A1 * | 5/2007 | Gotou | A63H 27/02 | 446/37 |
| 2008/0132143 A1 * | 6/2008 | Miyaura | A63H 17/268 | 446/409 |
| 2008/0180272 A1 * | 7/2008 | Scherer | A63H 30/04 | 340/13.24 |
| 2008/0285628 A1 * | 11/2008 | Gizis | A63H 30/04 | 375/135 |
| 2009/0156088 A1 * | 6/2009 | Mukaida | A63H 17/28 | 446/270 |
| 2009/0204276 A1 * | 8/2009 | Stuckman | A63H 27/12 | 701/2 |
| 2009/0248220 A1 * | 10/2009 | Ecton | B61L 3/127 | 701/2 |
| 2010/0112897 A1 * | 5/2010 | Ribbe | A63H 30/04 | 446/454 |
| 2011/0105082 A1 * | 5/2011 | Haley | H04M 1/72577 | 455/411 |
| 2011/0320830 A1 * | 12/2011 | Ito | G06F 1/24 | 713/300 |
| 2012/0146775 A1 * | 6/2012 | Kudo | A63H 30/04 | 340/12.5 |
| 2012/0245761 A1 * | 9/2012 | Chen | A63H 27/02 | 701/2 |
| 2013/0005215 A1 * | 1/2013 | Tell | A63H 30/04 | 446/456 |
| 2013/0109272 A1 * | 5/2013 | Rindlisbacher | A63H 30/04 | 446/454 |
| 2013/0120159 A1 * | 5/2013 | Stahlin | G08G 1/161 | 340/902 |
| 2013/0231029 A1 * | 9/2013 | Katz | A63H 30/04 | 446/454 |
| 2013/0273877 A1 * | 10/2013 | Kote | H04W 4/22 | 455/404.2 |
| 2013/0324250 A1 * | 12/2013 | Sofman | A63H 30/04 | 463/31 |
| 2014/0065926 A1 * | 3/2014 | Rehkemper | A63H 30/04 | 446/454 |
| 2015/0217203 A1 * | 8/2015 | Janson | A63H 33/26 | 446/466 |
| 2015/0309508 A1 * | 10/2015 | Cevik | G01C 19/00 | 701/2 |
| 2016/0062355 A1 * | 3/2016 | Saegusa | A63H 30/04 | 701/2 |
| 2016/0091895 A1 * | 3/2016 | Hed | A63H 30/04 | 701/2 |
| 2016/0103780 A1 * | 4/2016 | Dentamaro | G06F 13/4081 | 710/303 |
| 2016/0306349 A1 * | 10/2016 | Lau | G05D 1/0016 | |
| 2017/0173451 A1 * | 6/2017 | Pedersen | A63H 27/12 | |
| 2017/0336785 A1 * | 11/2017 | Young | A63H 30/04 | |

\* cited by examiner

US 10,094,669 B2

SYSTEMS AND METHODS FOR INERTIALLY-INSTITUTED BINDING OF A RC VEHICLE

BACKGROUND

The disclosed systems and methods relate generally to the field of radio-frequency (RF) devices. More specifically, the invention relates to establishing an RF link between a radio-controlled (RC) vehicle and its associated hand-held controller in response to an inertial measurement of the RC vehicle.

RC devices, including radio-controlled model vehicles, such as cars, boats, planes, helicopters, quadcopters, and other rotorcraft are enjoyed by hobbyists recreationally and competitively. FIG. 1 shows a radio-controlled system 100 known in the art. Conventional radio-controlled system 100 may include a radio-controlled device 110 and a hand-held controller 120. The radio-controlled device 110, such as a car, is typically controlled by a user through the use of a hand-held controller 120 that transmits radio signals corresponding to the user's input to a radio receiver component (not shown) of the radio-controlled device 100 via a wireless RF link 130. This allows the user to control a speed and direction of movement of the radio-controlled device 110 via the hand-held controller 120.

A common problem associated with RC vehicles relates to the process of establishing the wireless RF link between the vehicle (i.e., with a receiver on the vehicle) and the hand-held controller. This process of establishing the wireless RF link between components may be referred to as "binding." After the wireless RF link is established (i.e., the RF receiver and the RF hand-held controller are bound), the components only communicate with each other. This allows multiple RC vehicles and transmitters to operate in the same geographical location.

One known method of binding requires a specialized plug (e.g., a "bind plug") to be placed in the RC vehicle (e.g., in the receiver of the RC vehicle) before applying power to the RC vehicle. This type of binding has several drawbacks: users may lose the specialized plug, a portion of the RC vehicle might need to be taken apart to get the specialized plug into place (e.g., the canopy of an RC car may have to be removed to reach a port on a receiver), and it may be physically challenging to install or remove the specialized plug.

Another known method of binding entails a time-out method. In the time-out method, an RF component automatically enters the bind process for a fixed period of time after power is applied to the RF component. This type of binding may confuse consumers if the user does not apply power to the hand-held controller within the fixed period of time and has led to a poor user experience.

SUMMARY

Example implementations may relate to RF components that bind to each other regardless of the order in which power is applied and without any specialized plugs. In some embodiments, an RC vehicle may include a receiver, an inertial measurement unit, and vehicle controller circuitry. The RC vehicle may be rotated in some manner (e.g., from right-side up to upside-down or from a forward heading to a reverse heading) as a way to instruct the receiver (via the vehicle controller circuitry) to enter into a bind mode and bind to a transmitter.

Referring back to FIG. 1, before the hand-held controller 120 can send/receive radio signals to/from the radio-controlled device 110, the controller 120 and the device 110 must establish the RF link 130. One aspect of establishing the RF link 130 includes at least one of sending, receiving, exchanging, and/or verifying identification and/or authentication data between the hand-held controller 120 and the radio-controlled device 110 to confirm that the radio-controlled device 110 is receiving commands from the desired controller 120 (i.e., the controller to which it was bound to at setup). Initially establishing the RF link 130 between the controller 120 and the device 110 is one aspect of a process referred to herein as binding, radio-frequency (RF) link synchronization, or simply synchronization. After binding, an individual controller and an individual device are uniquely associated with each other such that, in a multiuser environment like the one shown in FIG. 2, each device 220, 250, and 280 responds only to radio signals transmitted by its corresponding associated controller 210, 240, and 270, respectively.

Accordingly, it is desirable for radio-controlled systems to include mechanisms and methods for rapidly and easily binding the hand-held controller 110 and the radio-controlled device 110 so that the operator can gain control of the device 110. To overcome the drawbacks of existing systems and methods, the disclosed systems and methods for fast and reliable binding include:

An RC vehicle according to one example embodiment includes a receiver operable to bind to a transmitter via a bind mode. The RC vehicle includes an inertial measurement unit coupled to the RC vehicle and configured to output inertial data. The RC vehicle includes vehicle controller circuitry electrically connected to the receiver and the inertial measurement unit and configured to receive the inertial data and, in response to receiving the inertial data, instruct the receiver to operate in a bind mode.

An RC vehicle according to another example embodiment includes a receiver operable to bind to a transmitter via a bind mode. The RC vehicle includes an inertial measurement unit coupled to the RC vehicle and configured to output inertial data. The RC vehicle includes vehicle controller circuitry electrically connected to the receiver and the inertial measurement unit and configured to receive the inertial data, compare the inertial data to a threshold, and, when the inertial data meets the threshold, instruct the receiver to operate in a bind mode.

An RC vehicle according to a further example embodiment includes a receiver coupled to the RC vehicle and a transmitter. The RC vehicle includes an inertial measurement unit coupled to the RC vehicle and configured to output inertial data. The RC vehicle includes vehicle controller circuitry electrically connected to the receiver and the inertial measurement unit and configured to receive the inertial data, compare the inertial data to a threshold, and, when the inertial data meets the threshold, instruct the receiver and the transmitter to operate in a bind mode.

A method according to one example embodiment includes applying power to a receiver coupled to an RC vehicle where the receiver is operable to bind to a transmitter. The method includes receiving, via vehicle controller circuitry or other circuitry and/or software process(es), inertial data from an inertial measurement unit coupled to the RC vehicle. The method includes comparing, via vehicle controller circuitry or other circuitry and/or software process(es), the inertial data to a programmed inertial value. When the programmed inertial value equals the inertial data, the method includes instructing, via the vehicle controller circuitry, a receiver to enter a bind mode.

In some embodiments, the methods disclosed and described herein may be implemented by one or more processors executing instructions stored on one or more tangible, non-transitory computer-readable media.

These as well as other aspects, advantages, and alternatives will become apparent to those of ordinary skill in the art by reading the following detailed description, with reference where appropriate to the accompanying drawings.

DETAILED DESCRIPTION

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Example Systems

Figure 1:
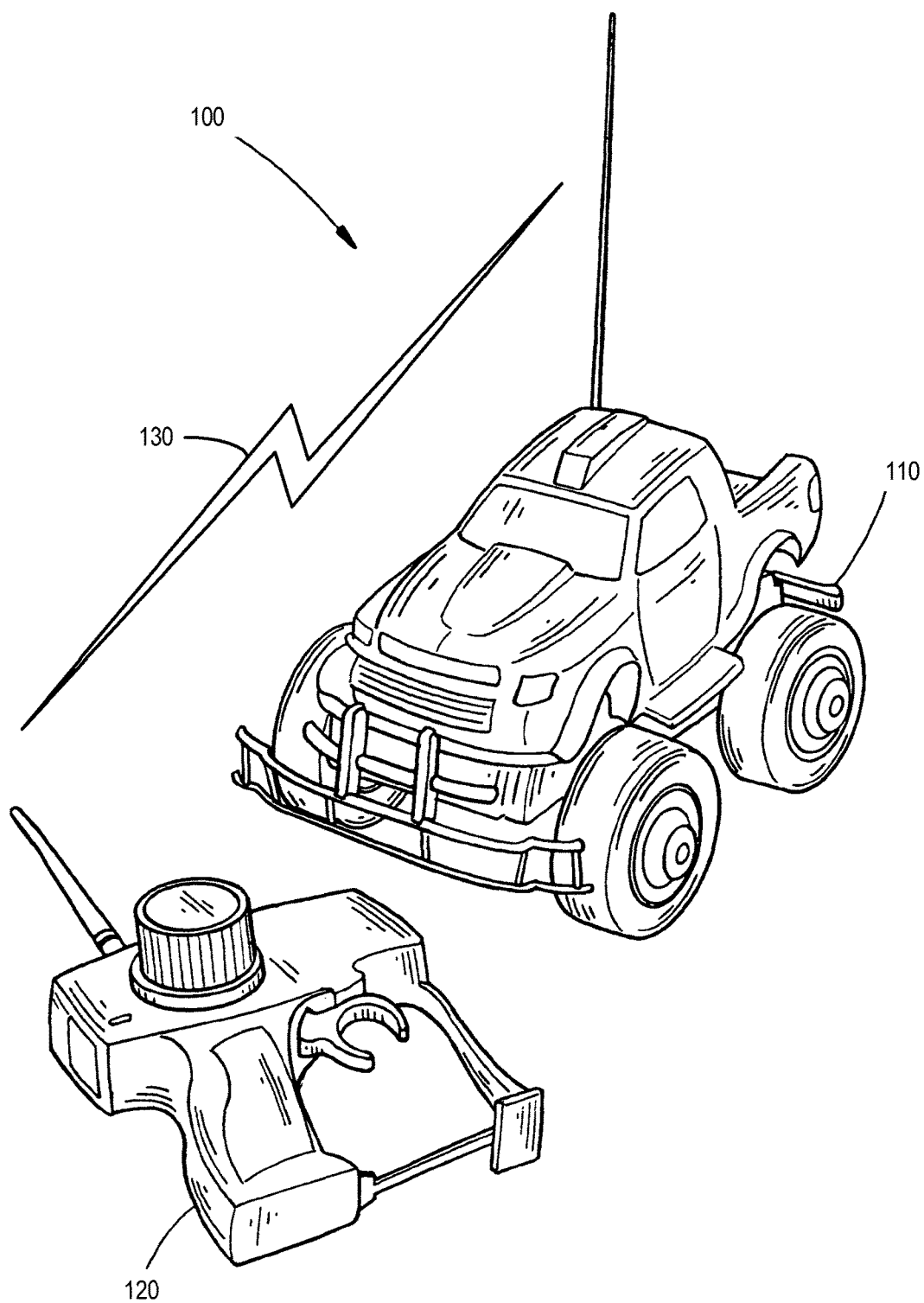
FIG. 1 illustrates a radio-controlled system known in the art.
Figure 2:
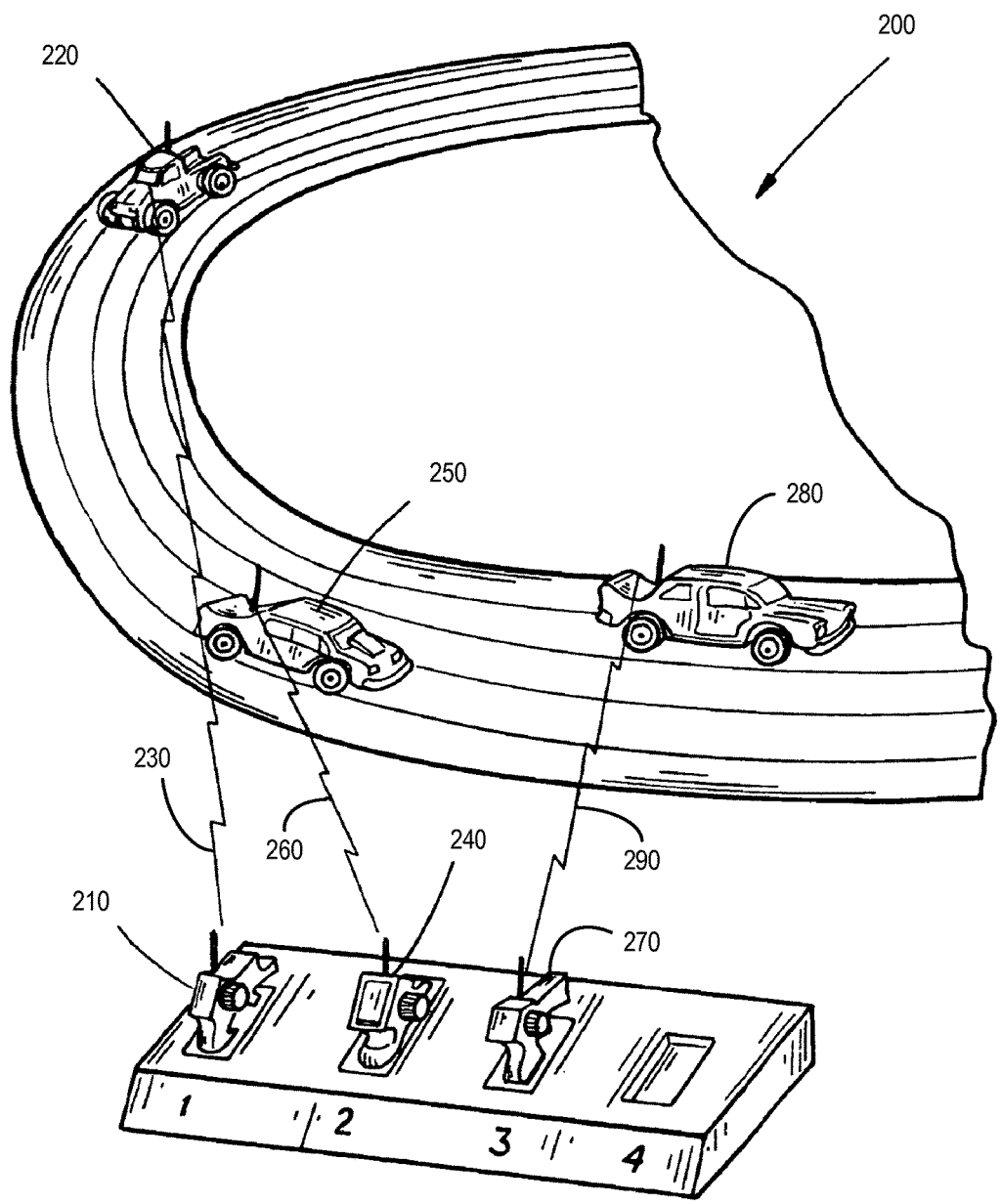
FIG. 2 illustrates multiple radio-controlled systems operating in the same geographical area.
Figure 3:
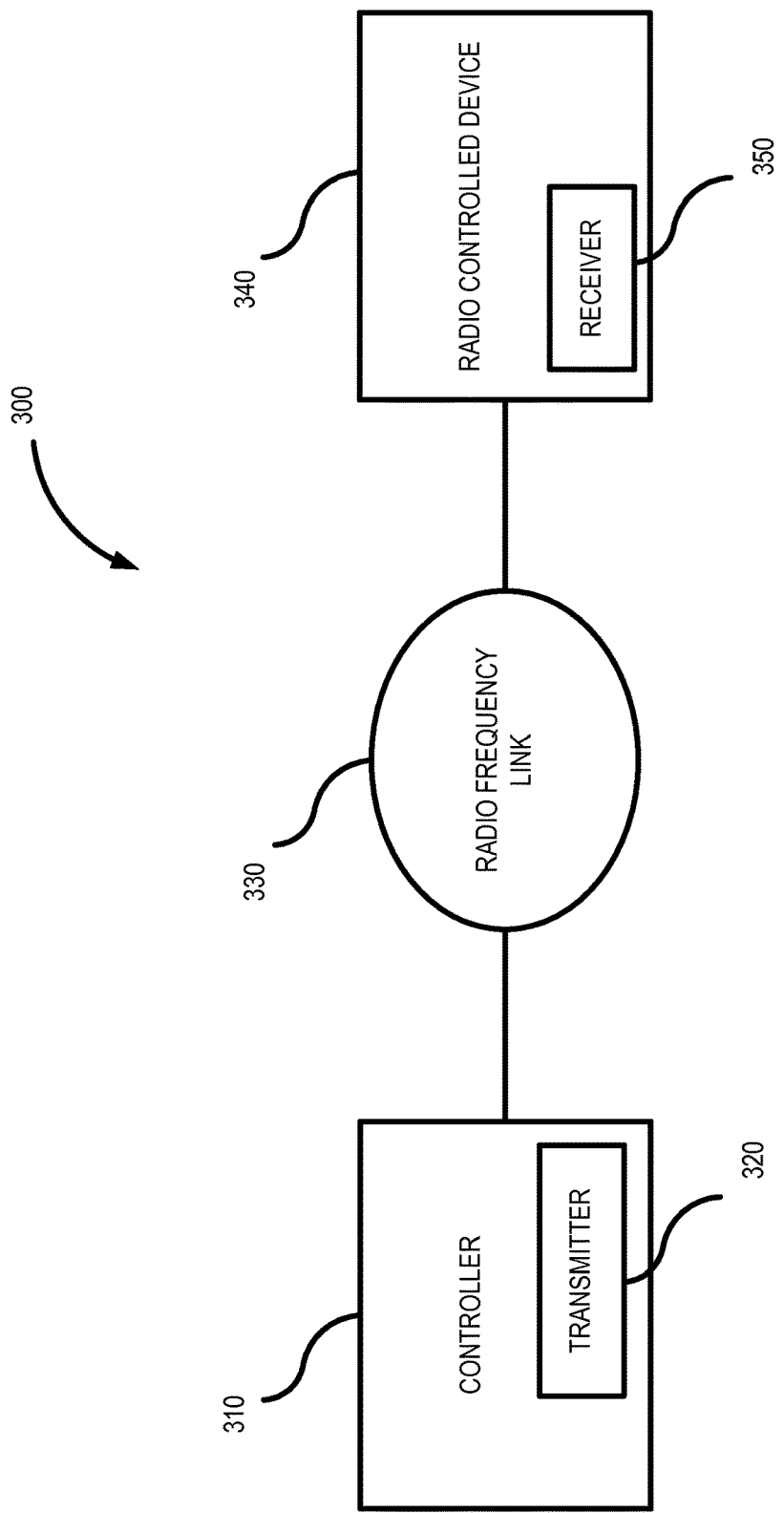
FIG. 3 illustrates an embodiment of a system for controlling a radio-controlled device.

FIG. 3 shows one embodiment of a radio-controlled system 300 for controlling a radio-controlled device 340. System 300 includes a controller 310 suitable for controlling the radio-controlled device 340. Controller 310 comprises a transmitter module 320 and radio-controlled device 340 comprises a receiver module 350. In preferred embodiments, radio-controlled device 340 is one of (i) a terrestrial vehicle such as a car or motorcycle, (ii) a watercraft, such as a boat, (iii) an aircraft such as an airplane or helicopter, or (iv) a similar RC vehicle. For example, radio-controlled device 340 may be a model device, or a smaller scale version of a terrestrial vehicle, watercraft, aircraft, or similar RC vehicle designed for use by hobbyists.

Once bound, a radio-frequency link 330 connects the controller 310 with the radio-controlled device 340. In preferred embodiments, the radio-frequency link 330 is effectuated over one of a plurality of available radio channels in the 2.4 GHz Industrial, Scientific, and Medical (ISM) radio band. However, other frequency bands could be used instead, including but not limited to the 5.8 GHz ISM band, for example.

In some embodiments, the radio-controlled device 340 additionally includes a transmitter (not shown) configured to send data from the radio-controlled device 340 to a receiver (not shown) associated with the controller 310. In such embodiments, this "back channel" can be used for telemetry applications, including but not limited to, signaling the state and/or status of the communications link 330 from the controller 310 to the radio-controlled device 340, for example.

In preferred embodiments, the communications link is a digital communications link. In some embodiments, the controller and the radio-controlled device may employ spread spectrum modulation, such as a form of direct sequence spread spectrum (DSSS) modulation, or combination of DSSS and FHSS. Frequency-hopping spread spectrum (FHSS). In DSSS, the transmitter modulates data for transmission according to a continuous string of pseudo-noise (PN) code symbols that is known by both the transmitter and receiver. Frequency-hopping spread spectrum (FHSS) is a method of transmitting radio signals by rapidly switching a carrier among many frequency channels, using a PN sequence that is known by both the transmitter and receiver. In some embodiments, the transmitter and receiver may first synchronize with each other over a single radio-frequency channel, use that particular channel to send PN code information required for DSSS and/or FHSS operation, and then initiate the DSSS and/or FHSS protocol thereafter.

In some embodiments, the PN sequence required for DSSS operation may be shared between the transmitter and receiver at system initialization or may be derived from a Globally Unique Identifier (GUID) associated with the receiver such that data transmitted by the transmitter and data received by the receiver in connection with the RF link synchronization is modulated and demodulated, respectively, according to the shared PN sequence. Such embodiments can still employ the presently disclosed systems and methods to establish an RF link over which to send DSSS modulated data. Similarly, in some embodiments, the PN sequence required for FHSS operation may be shared between the transmitter and receiver at system initialization or derived from a GUID associated with the receiver. In such embodiments, it may still be advantageous to employ the presently disclosed systems and methods to establish an RF channel and exchange data for initiating the FHSS protocol, e.g., time-synchronization information for the FHSS protocol.

Figure 4:
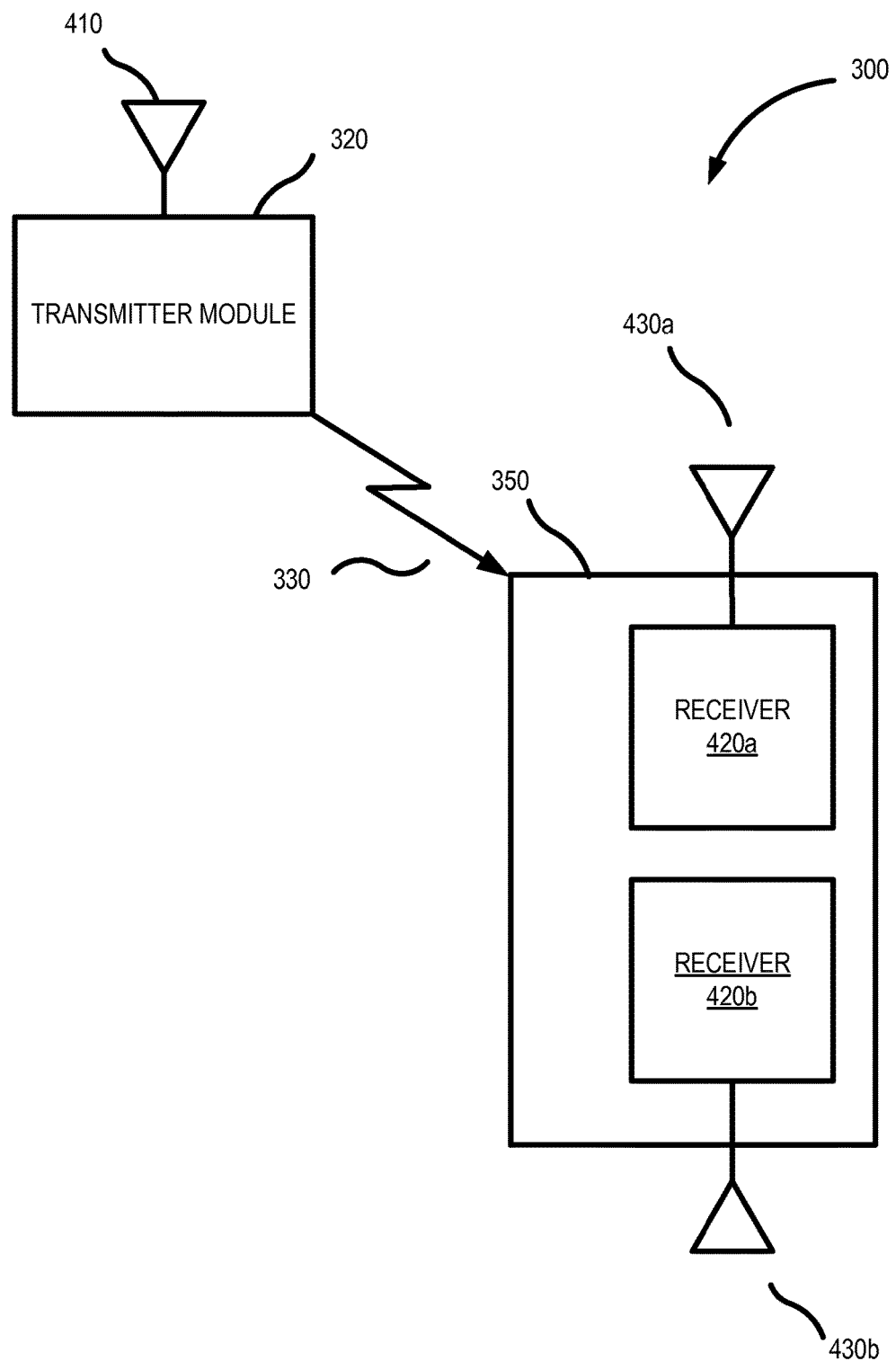
FIG. 4 illustrates an embodiment of a system for controlling a radio-controlled device.

As shown in FIG. 4, in some embodiments, the receiver module 350 may include two receivers 420a and 420b, each coupled to its own antenna 430a and 430b. Some embodiments may include three, four, or more receivers. In some embodiments, the receivers 420a and 420b may be configured to receive data via the same channel at substantially the same time. In other embodiments, the receiver 420a and 420b may be configured to receive data via two different channels at substantially the same time. Further, the transmitter module 320, having at least one antenna 410, may be capable of transmitting two or more discrete frequencies and establishing two or more corresponding RF links. It is also contemplated that the transmitter module may include two separate transmitters (not shown) in some embodiments.

Figure 5:
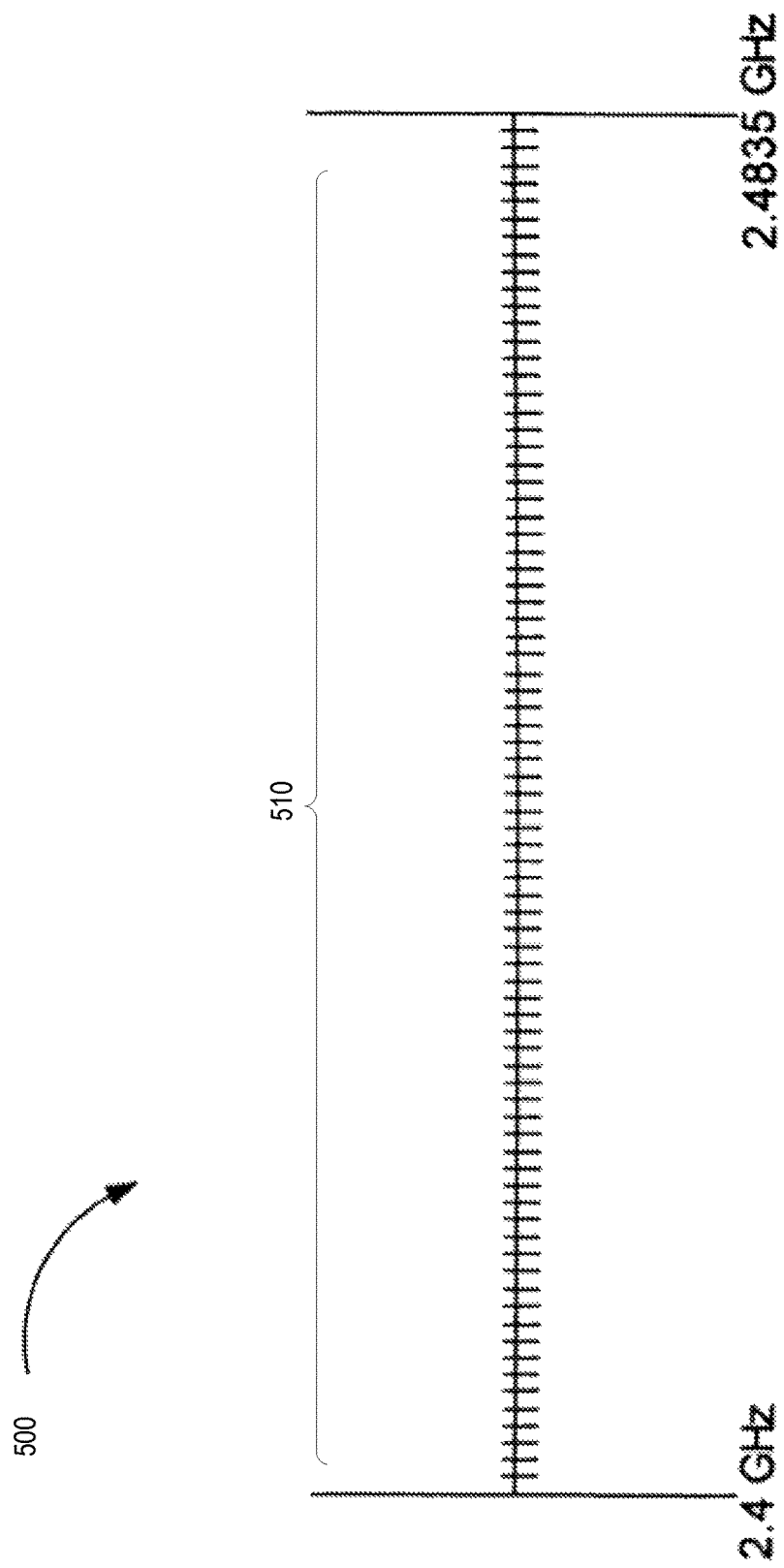
FIG. 5 illustrates an RF spectrum for use with the disclosed systems and methods.

FIG. 5 shows a diagram of the 2.4 GHz ISM spectrum 500 employed by some embodiments. The 2.4 GHz band may be divided into 79 separate 1 MHz channels 510, but other subdivisions of the 2.4 GHz band could be used as well. The frequency bands of 2.4 GHz to 2.4835 GHz are advantageous in that they are out of the range of typical model-generated (motor and Electronic Speed Controller (ESC)

noise) and conventional radio interference. Radio interference generally occurs in the 27 and 75 MHz bands. Operating at in the 2.4 GHz Industrial Scientific and Medical (ISM) band may eliminate or at least substantially reduce interference typically experienced by 27, 30, 35, 40, 50, 53, 72 and 75 MHz radios and other usable radio control frequencies below 300 MHz, providing enhanced control and reliability of radio-controlled devices. It is further contemplated that a radio-controlled system may operate in any other frequency band higher than 2.4 GHz, such as the 5.8 GHz band or the like.

As disclosed herein, a receiver (e.g., receiver module 350) must be bound to a particular controller (e.g., controller 310) to avoid interference with radio signals from other controllers. To bind a receiver to a particular controller, both the receiver and the controller typically must be simultaneously operated in a binding mode. In operation, during binding mode in some embodiments, the receiver may scan for a free channel (e.g., one of the 79 channels disclosed in reference to FIG. 5). When a free channel is detected, the receiver may listen for a globally unique identifier (GUID) from the transmitter. The GUID may be preprogrammed into the transmitter, or may be programmable via the transmitter. The receiver may lock onto the GUID of the transmitter. Once a receiver is bound to a transmitter, the RC system digitally encodes data and assigns data a unique frequency code. Data is then scattered across the frequency band in a pseudo-random pattern. The receiver deciphers only the data corresponding to a particular code to reconstruct the signal. Thus, the receiver only recognizes signals from the particular transmitter to which it is bound.

Figure 6:
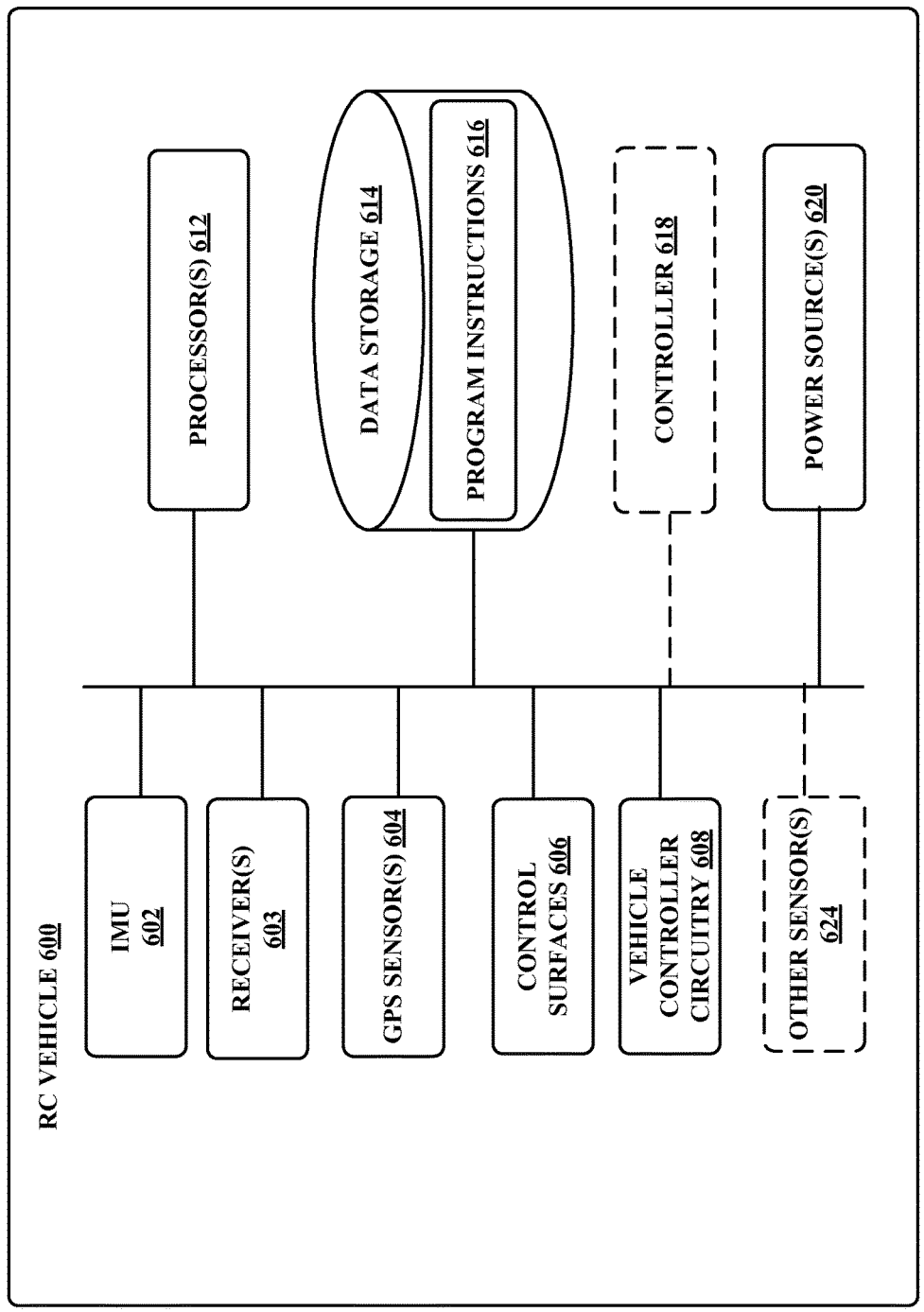
FIG. 6 is a block diagram showing components of an example RC vehicle 600 according to some embodiments.

FIG. 6 is a block diagram showing components of an example RC vehicle 600 according to some embodiments. RC vehicle 600 includes inertial measurement unit ("IMU") 602, receiver(s) 603, global positioning system ("GPS") sensors 604, control surfaces 606, vehicle controller circuitry 608, one or more processor(s) 612, data storage 614, program instructions 616, controller 618, power source(s) 620, and other sensors 624. Note that the components of the RC vehicle 600 are shown for illustration purposes only and may include additional components and/or have one or more components removed without departing from the scope of the disclosure. Further, note that the various components of RC vehicle 600 may be communicatively coupled or otherwise in communication with each other in any manner now known or later developed that enables the components to operate as a system to perform the functionality described herein.

Inertial measurement unit (IMU) 602 may include one or more gyroscopes, accelerometers, and/or magnetometers to sense orientation, velocity, and/or gravitational forces on, or acting on, the RC vehicle 600. Although GPS sensor 604 is depicted as a separate component, IMU 602 and GPS sensor 604 may be integrated into a single IMU. GPS sensor(s) 604 may also be referred to as GPS receivers. GPS sensor(s) 604 calculate geographical location data by receiving information from GPS satellites. Control surfaces 606 may differ between RC vehicles and are used to control the RC vehicle while in operation. Control surfaces 606 may include, e.g., servomotor, throttle, elevator, ailerons, swashplates, rudder, landing gear, flaps, and rotor pitch, among others. Vehicle controller circuitry 608 may be integrated within another component (e.g., a RF receiver or a flight or drive stabilization system) and may be configured to communicate with controller 618 (e.g., via a digital spread spectrum RF link). In some embodiments, the vehicle controller circuitry 608 may be integrated with or comprise the one or more processors 612. Controller 618 may also be referred to as a transmitter and may be a separate component or integrated within another component (e.g., a tablet, PC, or smartphone).

Processor(s) 612 may include one or more general-purpose processors and/or special purpose processors (e.g., digital signal processors, application specific integrated circuits, etc.). The processor(s) 612 can be configured to execute computer-readable program instructions 616 that are stored in the data storage 614 and are executable to cause the RC vehicle 600 to perform the functions and features described herein. For instance, the program instructions 616 may be executable to provide functionality of the vehicle controller circuitry 608, where the vehicle controller 608 may be configured to instruct a servomotor to cause movement of one or more control surfaces 606. Processor(s) 612, data storage 614, and computer-readable program instructions 616 may be integrated within other components, such as the vehicle controller circuitry 608.

The data storage 614 may include or take the form of one or more computer-readable storage media that can be read or accessed by processor(s) 612. The one or more computer-readable storage media can include volatile and/or non-volatile storage components, such as optical, magnetic, organic or other memory or disc storage, flash memory, Erasable Programmable Read Only Memory (EPROM), or any other type of memory suitable for use with a radio-controlled device now known or later developed, which can be integrated in whole or in part with processor(s) 612. In some embodiments, the data storage 614 can be implemented using a single physical device (e.g., one optical, magnetic, organic or other memory or disc storage unit), while in other embodiments, the data storage 614 can be implemented using two or more physical devices. Further, in addition to the computer-readable program instructions 616, the data storage 614 may include additional data such as diagnostic data, among other possibilities.

The RC vehicle 600 may optionally include one or more additional sensor(s) 624, in addition to IMU 602, such as alarms (e.g., audible sensors, speakers, flashing lights), load sensors, position sensors, touch sensors, ultrasonic range sensors, infrared sensors, sonar, optical sensors, biosensors, force sensors, proximity sensors, Radio Frequency identification (RFID) sensors, Near Field Communication (NFC) sensors, wireless sensors, compasses, smoke sensors, light sensors, radio sensors, depth sensors (e.g., Red Green Blue plus Depth (RGB-D), lasers, structured-light, and/or a time-of-flight camera), microphones, speakers, radar, cameras (e.g., color cameras, grayscale cameras, and/or infrared cameras), and/or motion sensors (e.g., gyroscopes, accelerometers, inertial measurement units (IMU), and/or foot step or wheel odometry), among others. The additional sensor(s) 624 may provide sensor data to the processor(s) 612, and/or vehicle controller circuitry 608, to allow for appropriate interaction of the RC vehicle 600 with the environment.

Additionally, the RC vehicle 600 may also include one or more power source(s) 620 configured to supply power to various components of the RC vehicle 600. Any type of power source may be used such as, for example, a gasoline engine, an electric motor (e.g., a servomotor) and one or more batteries, or others.

In operation according to some embodiments, an RC vehicle may include a receiver, an inertial measurement unit, and vehicle controller circuitry. The inertial measurement unit may be configured to output inertial data. For example, the inertial measurement unit may include gyroscope sensors configured to output angular data, accelerometer sensors configured to output acceleration data, or other sensors configured to measure and report the RC vehicle's position, orientation, velocity, and/or gravitational force. The vehicle controller circuitry may be configured to instruct the receiver to enter a bind mode based on inertial data received from the inertial measurement unit. In some embodiments, the vehicle controller circuitry may only instruct the receiver to enter a bind mode if certain conditions are met. For example, a programmable threshold may be set to determine how much inertial movement or rotation is required to instruct the receiver to enter the bind mode.

In some embodiments, after power is initially applied to the receiver (e.g., a charged battery is connected to the RC vehicle), the inertial measurement unit measures a steady-state (or initial) inertial value. For example, in a likely scenario, the RC vehicle is sitting upright when the battery is connected and the receiver is powered on. Using an inertial measurement unit with an accelerometer mounted along the Z-axis (e.g., the vertical axis with respect to the ground) as an example, in this case the accelerometer will read approximately 1.0 g. The RC vehicle may then be rotated upside down, such that the accelerometer measurement is −1.0 g. If the programmable threshold is set to −1.0 g, then the vehicle controller circuitry will instruct the receiver to enter the bind mode. Alternatively, the programmable threshold could be a comparison between an initial inertial value and the programmable threshold.

Alternatively or additionally, other inertial data may be used to determine when to enter bind mode. For example, one or more gyroscope sensors may be used to detect angular data. The vehicle controller circuitry may then receive the angular data and instruct the receiver to enter bind mode based on a detected change in position, orientation, or angular rate.

Once the receiver has entered bind mode, the vehicle controller circuitry may prevent the receiver from entering bind mode again until certain conditions are met. This is important because it may be dangerous for the RC vehicle to enter a bind mode while it is moving or in operation. In some embodiments, after power is initially applied to the receiver, the vehicle controller circuitry only allows subsequent binding if throttle is at zero, the inertial data received from the inertial measurement unit meets certain conditions (e.g., the inertial data is back to a steady-state initial value), and/or other criteria or met.

In some embodiments, after the receiver is bound to a transmitter, the RC vehicle may be further used to assist with setup. For example, the inertial data may be used to advance or decrement values (e.g., trim values), scroll through menus (e.g., programming menus), or otherwise assist with preparing the model for operation.

III. Example Methods

Figure 7:
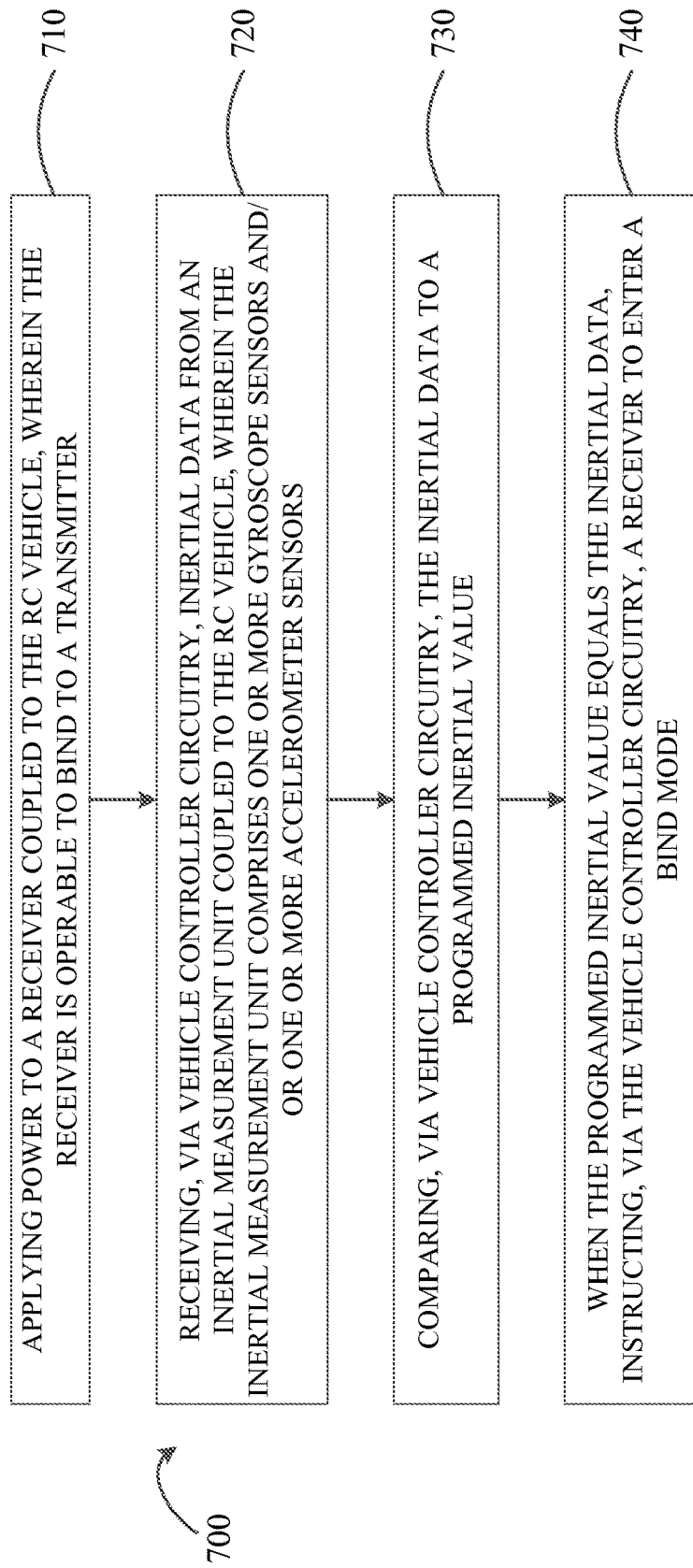
FIG. 7 is an example flowchart for an inertially-instituted binding method 700, according to some embodiments.

FIG. 7 is an example flowchart for an inertially-instituted binding method 700, according to some embodiments. In some embodiments, method 700 may be implemented by one or more processors and non-transitory computer-readable media having instructions that are executable to cause the device to perform functions described herein. Method 700 and other processes and methods disclosed herein may include one or more operations, functions, or actions as illustrated by one or more of blocks 710-740. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of the disclosed embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a Flash memory, EPROM, a disk or hard drive, or any other type of memory suitable for use with a radio-controlled device now known or later developed. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and other processes and methods disclosed herein, each block in FIG. 7 may represent circuitry that is wired to perform the specific logical functions in the process.

At block 710, method 700 includes applying power to a receiver coupled to the RC vehicle, wherein the receiver is operable to bind to a transmitter. In some embodiments, one way to limit the possibility of accidentally switching into a bind mode is to only allow bind mode after an initial power up. However, in some embodiments, it may be desirable to have additional safeguards in addition to the initial power up safety mechanism. For example, in some circumstances (e.g., brown-outs), the voltage applied to the receiver may drop below its rated operating voltage due to, e.g., a high current pull elsewhere in the system or drain in the battery.

At block 720, method 700 includes receiving, via vehicle controller circuitry, inertial data from an inertial measurement unit coupled to the RC vehicle, wherein the inertial measurement unit comprises one or more gyroscope sensors and/or one or more accelerometer sensors. This inertial data may include initial data (e.g., steady-state data at power initialization that indicates a resting position) and/or periodic updates to inertial data as the vehicle is moved around or moves around.

At block 730, method 700 includes comparing, via vehicle controller circuitry, the inertial data to a programmed inertial value. For example, the vehicle controller circuitry may compare received accelerometer or gyroscope data to a programmed value to determine whether the RC vehicle has met the requirements for instructing the receiver to enter bind mode. For example, the vehicle controller circuitry may compare the received inertial data to see whether it corresponds to the RC vehicle being turned upside-down, turned from front to back, turned a certain number of degrees to the right or left, rotated a certain number of degrees about one or more axes (e.g., a pitch, roll, yaw, or other axis), or any other conceivable programmable threshold.

At block 740, method 700 includes, when the programmed inertial value equals the inertial data, instructing, via the vehicle controller circuitry, a receiver to enter a bind mode.

V. Conclusion

The present disclosure is not to be limited in terms of the particular implementations described in this application, which are intended as examples or illustrations of various aspects of the systems and methods disclosed and described herein. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A Radio Controlled (RC) vehicle with inertially-instituted binding comprising:
a receiver coupled to the RC vehicle;
a transmitter;
an inertial measurement unit coupled to the RC vehicle and configured to output inertial data; and
vehicle controller circuitry electrically connected to the receiver and the inertial measurement unit and configured to:
receive the inertial data;
compare the inertial data to a programmable threshold; and
when the inertial data meets or exceeds the programmable threshold, bind the receiver and the transmitter to mitigate interference with other transmitters.

2. The RC vehicle of claim 1, wherein the inertial measurement unit comprises at least one gyroscope sensor configured to output angular data.

3. The RC vehicle of claim 1, wherein the inertial measurement unit comprises at least one accelerometer sensor configured to output acceleration data.

4. A method of inertially-instituted binding implemented by a Radio Controlled (RC) vehicle comprising:
applying power to a receiver coupled to the RC vehicle, wherein the receiver is operable to bind to a transmitter;
receiving, via vehicle controller circuitry, inertial data from an inertial measurement unit coupled to the RC vehicle;
comparing, via vehicle controller circuitry, the inertial data to a programmed inertial value; and
when the inertial data equals, or exceeds, the inertial data, the programmed inertial value, instructing, via the vehicle controller circuitry, the receiver to enter a bind mode; and
binding, after entering into the bind mode, the receiver with the transmitter to mitigate interference with other transmitters.

5. The method of claim 4, wherein the inertial measurement unit comprises at least one gyroscope sensor configured to output angular data.

6. The method of claim 5, wherein the inertial measurement unit comprises at least one accelerometer sensor configured to output acceleration data.

* * * * *